(12) United States Patent
Wang

(10) Patent No.: US 11,179,811 B2
(45) Date of Patent: Nov. 23, 2021

(54) BACK WALL PROTECTION DEVICE FOR DRILLING INJECTOR NOZZLE

(71) Applicant: Luxcelis Technologies LLC, Latrobe, PA (US)

(72) Inventor: Weimin Wang, North Huntington, PA (US)

(73) Assignee: Luxcelis Technologies LLC, Latrobe, PA (US)

( * ) Notice: Subject to any disclaimer, the term of this patent is extended or adjusted under 35 U.S.C. 154(b) by 253 days.

(21) Appl. No.: 16/007,578

(22) Filed: Jun. 13, 2018

(65) Prior Publication Data

US 2018/0354077 A1 Dec. 13, 2018

Related U.S. Application Data

(60) Provisional application No. 62/518,963, filed on Jun. 13, 2017.

(30) Foreign Application Priority Data

Nov. 8, 2017 (CN) .......................... 201711090740.9

(51) Int. Cl.
*B23K 26/382* (2014.01)
*F02M 61/16* (2006.01)
*B23K 26/70* (2014.01)
*B23K 101/00* (2006.01)
*B23K 101/06* (2006.01)

(52) U.S. Cl.
CPC .......... *B23K 26/389* (2015.10); *B23K 26/706* (2015.10); *F02M 61/168* (2013.01); *B23K 2101/006* (2018.08); *B23K 2101/06* (2018.08); *F02M 2200/8069* (2013.01)

(58) Field of Classification Search
CPC ... B23K 26/389; B23K 26/706; F02M 61/168
See application file for complete search history.

(56) References Cited

U.S. PATENT DOCUMENTS

| 2,795,688 | A | * | 6/1957 | McCaffrey, Sr. | B23K 11/3009 |
| | | | | | 219/119 |
| 4,748,899 | A | * | 6/1988 | Cote | B23K 11/31 |
| | | | | | 91/189 R |
| 5,115,113 | A | * | 5/1992 | Miller | B23K 11/31 |
| | | | | | 219/117.1 |
| 6,020,569 | A | * | 2/2000 | Cecil | B23K 11/253 |
| | | | | | 219/109 |
| 6,070,813 | A | | 6/2000 | Durheim | |
| 6,825,436 | B1 | * | 11/2004 | Aoyama | B23K 11/002 |
| | | | | | 219/117.1 |
| 7,301,121 | B2 | | 11/2007 | Callies et al. | |
| 2007/0175872 | A1 | | 8/2007 | Rhoades et al. | |
| 2009/0032508 | A1 | * | 2/2009 | Kobayashi | B23K 26/18 |
| | | | | | 219/121.71 |

FOREIGN PATENT DOCUMENTS

| CN | 207534182 U | 6/2018 |
| WO | 0009884 A1 | 2/2000 |
| WO | 2007089469 A2 | 8/2007 |

* cited by examiner

*Primary Examiner* — John J Norton
(74) *Attorney, Agent, or Firm* — The Webb Law Firm

(57) ABSTRACT

Disclosed is a device for protecting the back wall of a fuel injector nozzle during drilling of nozzle holes.

13 Claims, 2 Drawing Sheets

BACK WALL PROTECTION DEVICE FOR DRILLING INJECTOR NOZZLE

BACKGROUND OF THE INVENTION

1. Field of the Invention

This invention relates to a device for protecting the back wall of a fuel injector nozzle during laser drilling of the nozzle holes.

2. Description of the Background

The fuel injector nozzle of combustion engines has an internal fuel path, and liquid fuel is sprayed out of the nozzle from the fuel path through several micro nozzle holes. The micro holes can be created by a laser drilling process. During laser drilling, once the laser penetrates the nozzle wall to form the micro hole, the laser beam path continues from the hole through the inside of the nozzle to the opposite internal surface of the nozzle, causing potential damage to that surface, called the back wall. A device to protect the back wall during laser drilling of fuel injector nozzle holes is desirable.

SUMMARY OF THE INVENTION

A back wall protection device for laser drilling a fuel injector nozzle hole has a hollow shaft. The hollow shaft has a pressure path and a cylinder on top of the pressure path. An actuator, preferably a piston, is disposed in the cylinder, and a back wall protection component rests on top of the actuator. The back wall protection device is inserted in the fuel path of a fuel injector nozzle to be laser drilled. The actuator can be pushed upwards towards the nozzle tip, so that the back wall protection component blocks a laser beam path from a desired nozzle hole location to the back wall. When the actuator is a piston, pressurized fluid is introduced into the pressure path to push the piston and back wall protection component up towards the nozzle tip, so that the back wall protection component blocks a laser beam path from a desired nozzle hole location to the back wall. The actuator may also be a motor-driven linear actuator that can push the back wall protection component up towards the nozzle tip. A laser is then applied to the laser beam path to drill a nozzle hole at the desired location. When the laser penetrates the nozzle wall to form the nozzle hole, the laser will strike the back wall protection component that is blocking the laser beam path to the back wall, thereby protecting the back wall from laser damage.

BRIEF DESCRIPTION OF THE DRAWINGS

Aspects, features, benefits, and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

DETAILED DESCRIPTION OF THE INVENTION

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Figure 1:
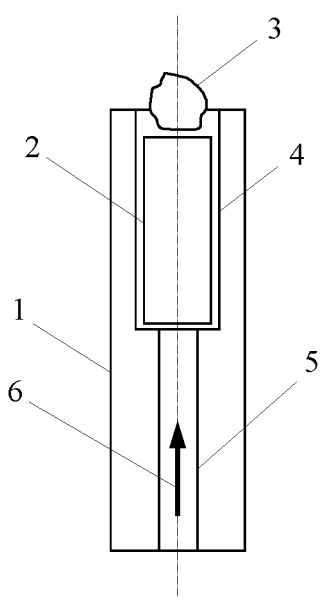
FIG. 1 shows a section view of an embodiment of a back wall protection device.

FIG. 1 shows a section view of an embodiment of a back wall protection device. As shown in FIG. 1, the back wall protection device has of a hollow shaft 1. Within the hollow shaft is a pressure path 5 and a cylinder 4 above the pressure path 5. An actuator 2 is disposed within the cylinder 4, and a back wall protection component 3 rests on top of the actuator 2. As shown in FIG. 1, the actuator 2 is a piston. To prevent the piston 2 from entering the pressure path 5 and retain the piston 2 within the cylinder 4, the pressure path 5 diameter is narrower than the cylinder 4 diameter and piston diameter 2. The piston 2 is actuated by introducing pressurized media 6 into the pressure path 5, pushing the piston 2 upwards in the cylinder 4. The pressurized media 6 preferably is air. Other examples of pressurized media include hydraulic oil, water, or other types of oil.

Other configurations may be used to retain the piston within the cylinder. For example, the pressure path and cylinder may have the same diameter, with a mechanical barrier between the pressure path and cylinder that retains the piston in the cylinder but allows pressurized media to pass from the pressure path to the cylinder to actuate the piston. In other configurations, the actuator for the back wall protection component is a motor-driven linear actuator instead of a piston.

The device shown in FIG. 1 may be integrated with the tooling fixture of an injector nozzle, and placed within the internal fuel path of the fuel injector nozzle. During the machining process, pressurized media 6 passes through the pressure path 5 to actuate the piston 2 to push the back wall protection component 3 to the end of the internal fuel path of the fuel injector nozzle, where the drilling process occurs, to block the laser beam from striking the back wall that is the opposite internal surface of the drilled surface.

Figure 2A:
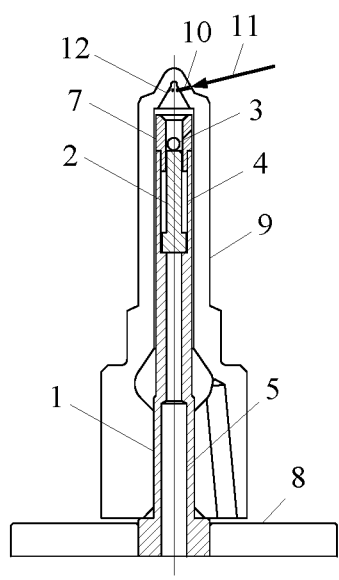
FIG. 2A shows a section view of an embodiment of a back wall protection device placed inside a fuel injection nozzle.
Figure 2B:
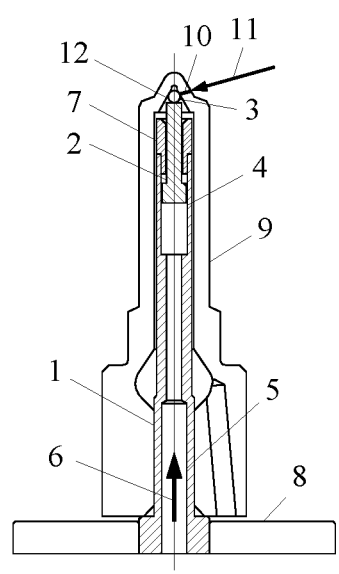
FIG. 2B shows a section view of an embodiment of a back wall protection device placed inside a fuel injection nozzle with the piston of the back wall protection device engaged.

FIG. 2A shows a section view of a typical implementation of a back wall protection device. In this application, the back wall protection device is installed on the interface plate 8 of a tooling fixture. A stop component 7 is applied to the top of the hollow shaft 1 to limit the upward travel of piston 2. The injector nozzle 9 to be machined is installed over the back wall protection device such that the device is inside the fuel path of the fuel injector nozzle 9. The fuel injector nozzle 9 is clamped onto the tooling fixture at the position shown in FIG. 2. The nozzle hole 10 is drilled by drilling, preferably with a laser, along a drilling path 11. As apparent from FIG. 2A, once the nozzle hole 10 is drilled, the back wall 12 of the fuel injector nozzle 9 can be damaged if the drilling mechanism (e.g., a laser) continues along the drilling path 11 from the nozzle hole 10 to the back wall 12. As shown in FIG. 2B, actuating the piston 2 of the back wall protection device blocks the drilling path 11 from the nozzle hole 10 to the back wall 12 to protect the back wall 12 from damage by the drilling mechanism.

FIG. 2B shows a section view of the typical implementation of FIG. 2A with the piston 2 of the back wall protection device actuated. Pressurized media 6 is introduced into the pressure path 5 to push the piston 2 upward in the cylinder 4, which pushes the protection component 3 up to the top position of the internal surface of the diesel injector nozzle 9. In this position, a drilling mechanism (e.g., a laser) may be applied along a drilling path 11 to drill a nozzle hole 10. The protection component 3 covers the back wall 12 to prevent the back wall 12 from being damaged by the drilling mechanism.

Accordingly, a method of laser drilling a fuel injector nozzle hole using the back wall protection device shown in FIGS. 2a and 2b includes placing a back wall protection device in a fuel path of a fuel injector nozzle 9. The back wall protection device has a hollow shaft 1, an actuator 2, and a back wall protection component 3. The hollow shaft has a pressure path 5 and a cylinder 4 above said pressure path 5, and the actuator 2 is disposed in the cylinder 4. The back wall protection component 3 rests on top of the actuator 2. Next, a pressurized media 6 is introduced into the pressure path 5 to push the actuator 2 and the back wall protection component 3 upwards so that the back wall protection component 3 blocks a laser beam path 11 from a desired nozzle hole location to the back wall 12 of said fuel injector nozzle. A laser is then applied to the laser beam path 11 to drill a nozzle hole 10 at the desired nozzle hole location. Once the laser penetrates the nozzle wall to form the nozzle hole 10, the laser strikes the back wall protection component 3 that is blocking the laser beam path 11.

The back wall protection component 3 may be a ball-type part made of thermal or laser beam resistant material. The thermal or laser beam resistant material may be metal, ceramics, sapphire, or ruby. The metal may be steel, carbide, copper, tungsten alloy, or other metal alloy. Because the laser beam strikes the back wall protection component 3 when the nozzle hole 10 is drilled through, the protection component 3 will be damaged. Therefore, the back wall protection component 3 should be replaced when necessary. The back wall protection component 3 may be in any shape according to the needs and requirements of the drilling process.

The disclosed back wall protection device can be used in any process of drilling of nozzle injectors of combustion engines, including laser beam drilling, electrical-discharge-machining (EDM) drilling, ultrasonic drilling, abrasive water drilling, mechanical drilling, etc.

Nothing in the above description is meant to limit the present invention to any specific materials, geometry, or orientation of elements. Various changes could be made in the construction and methods disclosed above without departing from the scope of the invention are contemplated within the scope of the present invention and will be apparent to those skilled in the art. The embodiments described herein were presented by way of example only and should not be used to limit the scope of the invention.

The invention claimed is:

1. A method of drilling a fuel injector nozzle hole, comprising:
   placing a back wall protection device in a linear fuel path of a fuel injector nozzle, said back wall protection device comprising a hollow shaft, an actuator, a stop component at a top of said hollow shaft to restrict upward movement of said actuator, and a back wall protection component, wherein said hollow shaft comprises a pressure path and a cylinder above said pressure path, a diameter of said pressure path is smaller than a diameter of said cylinder, said actuator is disposed in said cylinder, said back wall protection component rests on top of said actuator, said stop component extends partially within the cylinder of the hollow shaft and comprises an inner chamfer at a top of said stop component, and said stop component and said hollow shaft have a same diameter and are configured to be aligned along the linear fuel path;
   introducing a pressurized media into said pressure path to push said actuator and said back wall protection component upwards so that said back wall protection component blocks a drilling path from a desired nozzle hole location to a back wall of said fuel injector nozzle; and
   drilling along said drilling path to drill a nozzle hole at said desired nozzle hole location.

2. The method of claim 1, wherein said pressurized media is air.

3. The method of claim 1, wherein said actuator is a piston.

4. The method of claim 1, further comprising clamping said fuel injector nozzle to a tooling fixture.

5. The method of claim 1, further comprising installing said back wall protection device on an interface plate of a tooling fixture.

6. The method of claim 1, wherein said back wall protection component is made of a material selected from the group consisting of metal, ceramic, sapphire, and ruby.

7. The method of claim 1, wherein said back wall protection component is made of a material selected from the group consisting of steel and carbide.

8. The method of claim 1, wherein a laser is used to perform said drilling step.

9. A device for protecting an internal surface of a fuel injector nozzle during drilling of a hole in the fuel injector nozzle, comprising:
   a hollow shaft configured to be placed in a linear fuel path of the fuel injector nozzle, the hollow shaft comprising a pressure path and a cylinder above said pressure path, wherein a diameter of said pressure path is smaller than a diameter of said cylinder;
   an actuator disposed in said cylinder;
   a stop component at a top of said hollow shaft to restrict upward movement of said actuator, wherein the stop component extends partially within the cylinder of the hollow shaft and comprises an inner chamfer at a top of the stop component, and said stop component and said hollow shaft have a same diameter and are configured to be aligned along the linear fuel path; and
   a back wall protection component on top of said actuator, wherein said actuator is configured to be, in response to introduction of a pressured media into said pressure path, pushed upwards in said cylinder, causing the back wall protection component to block a drilling path from a desired nozzle hole location on the fuel injector nozzle to the internal surface.

10. The device of claim 9, wherein said back wall protection component is made of a material selected from the group consisting of metal, ceramic, sapphire, and ruby.

11. The device of claim 9, wherein said back wall protection component is made of a material selected from the group consisting of steel and carbide.

12. The device of claim 9, wherein said actuator is a piston.

13. The device of claim 12, wherein introduction of a pressurized media into said pressure path pushes said piston upwards in said cylinder.

\* \* \* \* \*

UNITED STATES PATENT AND TRADEMARK OFFICE
CERTIFICATE OF CORRECTION

| | | |
|---|---|---|
| PATENT NO. | : 11,179,811 B2 | Page 1 of 1 |
| APPLICATION NO. | : 16/007578 | |
| DATED | : November 23, 2021 | |
| INVENTOR(S) | : Weimin Wang | |

It is certified that error appears in the above-identified patent and that said Letters Patent is hereby corrected as shown below:

On the Title Page

Item (72) Inventor, Line 1, delete "Huntington," and insert -- Huntingdon, --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*